(12) United States Patent
Nelson

(10) Patent No.: US 7,589,827 B1
(45) Date of Patent: Sep. 15, 2009

(54) SYSTEM AND METHOD FOR DETECTING AN OBJECT IN A SEARCH SPACE

(75) Inventor: Robert S. Nelson, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 57 days.

(21) Appl. No.: 11/499,969

(22) Filed: Jul. 20, 2006

(51) Int. Cl.
*G01C 3/08* (2006.01)
(52) U.S. Cl. .................... 356/5.02; 356/5.01; 356/5.1
(58) Field of Classification Search ........ 356/3.01–3.15, 356/4.01–4.1, 5.01–5.15, 6–22
See application file for complete search history.

(56) References Cited

U.S. PATENT DOCUMENTS

| | | | |
|---|---|---|---|
| 4,189,233 A * | 2/1980 | Hurt et al. ................. | 356/4.02 |
| 4,218,987 A | 8/1980 | Park et al. | |
| 4,227,476 A | 10/1980 | Park et al. | |
| 4,649,275 A | 3/1987 | Nelson et al. | |
| 4,700,301 A * | 10/1987 | Dyke ........................... | 701/25 |
| 4,767,928 A | 8/1988 | Nelson et al. | |
| 4,829,184 A | 5/1989 | Nelson et al. | |
| 4,948,974 A | 8/1990 | Nelson et al. | |
| 6,288,974 B1 | 9/2001 | Nelson | |
| 2005/0195383 A1* | 9/2005 | Breed et al. ............... | 356/4.01 |
| 2007/0070808 A1 | 3/2007 | Ray | |
| 2008/0007729 A1* | 1/2008 | Hagler ....................... | 356/310 |

OTHER PUBLICATIONS

Frederic Lizzi, Mary Rorke, Joan Sokil-Melgar, Andrew Kalisz, and Jack Driller, Interfacing very-high-frequency transducers to digital-acquisition scanning systems; SPIE vol. 1733, 1992.
M. Fink, Object Detection and Imaging with Acoustic Time Reversal Mirrors, SPIE vol. 1942, pp. 256-267, 1993.
C. Nagasawa, M. Abo, J. Yamamoto, and O. Uchino, Random modulation cw lidar using new random sequence; Applied Optics, vol. 29, No. 10, pp. 1466-1470, 1990.
J. Briers, Laser Doppler and time-varying speckle: a reconciliation, J. Opt. Soc. Am. A, vol. 13, No. 2, pp. pp. 345-350, 1996.
J. Liu, et al., Laser Doppler and time-varying speckle: a reconciliation; IEEE Trans Medical Imaging, vol. 8, No. 2, pp. 168-172, 1989.

* cited by examiner

*Primary Examiner*—Thomas H Tarcza
*Assistant Examiner*—Luke D Ratcliffe
(74) *Attorney, Agent, or Firm*—Kyle Eppele; Peter A. Lipovsky; J. Eric Anderson

(57) ABSTRACT

A system for detecting an object of interest in a search space, comprising a radiation signal generator capable of generating a spatially-encoded radiation signal in the search space. The spatially-encoded radiation signal comprises a series of n beams, each having a unique characteristic, radially extending from the radiation signal generator, where n is a positive integer greater than one. The system also comprises a radiation signal collector disposed to detect and transform a reflected radiation signal reflected from the object of interest into a first data signal. The system also comprises a processor capable of transforming the first data signal into positional and vectoral data of the object of interest.

19 Claims, 8 Drawing Sheets

SYSTEM AND METHOD FOR DETECTING AN OBJECT IN A SEARCH SPACE

FEDERALLY-SPONSORED RESEARCH AND DEVELOPMENT

The System and Method for Detecting an Object in a Search Space was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 83775.

BACKGROUND OF THE INVENTION

Many industries, such as air traffic control, rely on the ability to accurately detect and track moving objects. Current systems and methods, however, have had difficulty detecting and tracking objects in close proximity to a surface or boundary between a search space and another medium.

A system and method is needed to overcome some of the difficulties encountered in detecting and tracking an object in close proximity to a boundary between a search space and another medium.

BRIEF DESCRIPTION OF THE DRAWINGS

Throughout the several views, like elements are referenced using like reference characters.

DETAILED DESCRIPTION OF EMBODIMENTS

Figure 1A:
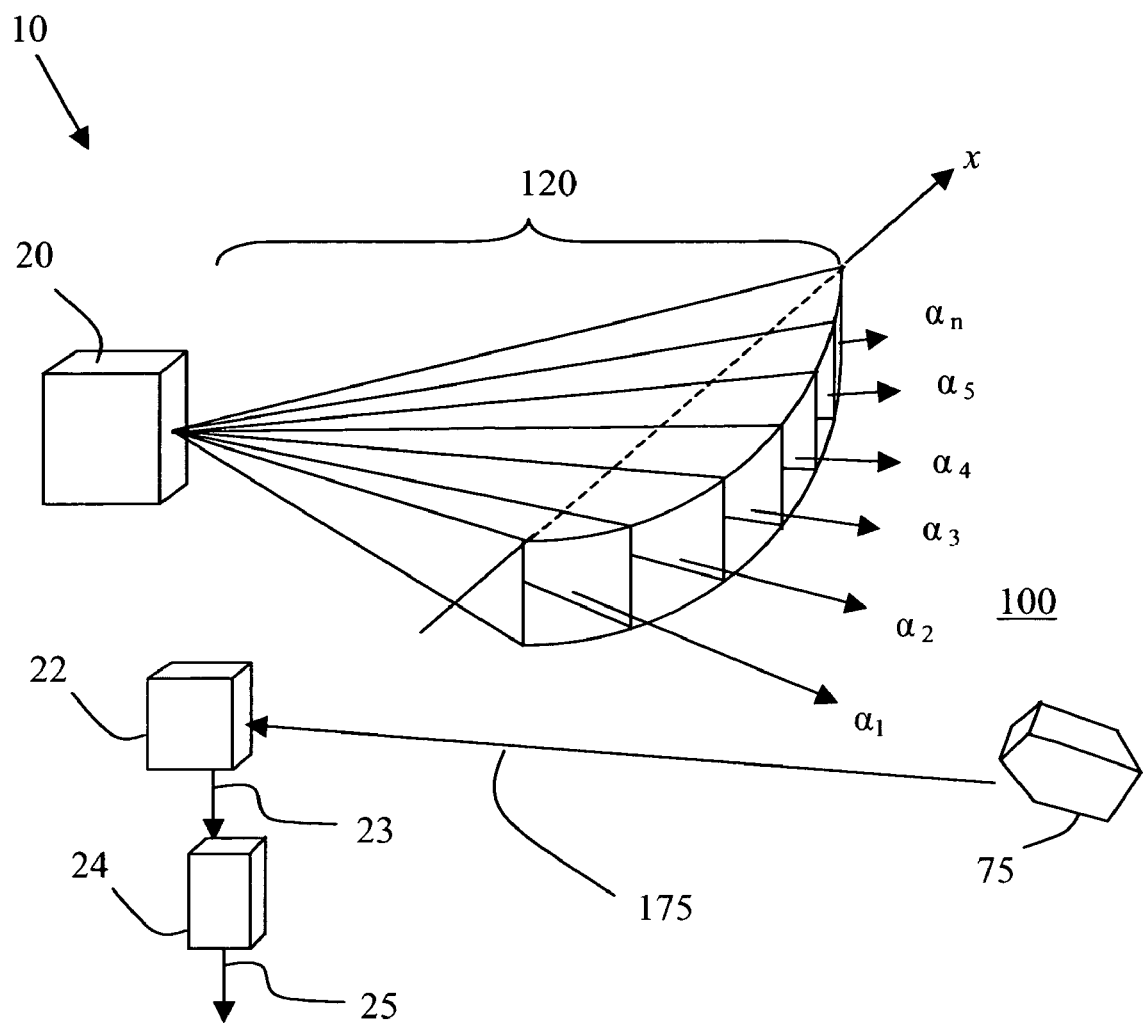
FIG. 1a shows an embodiment of a system for detecting an object of interest in a search space.
Figure 1B:
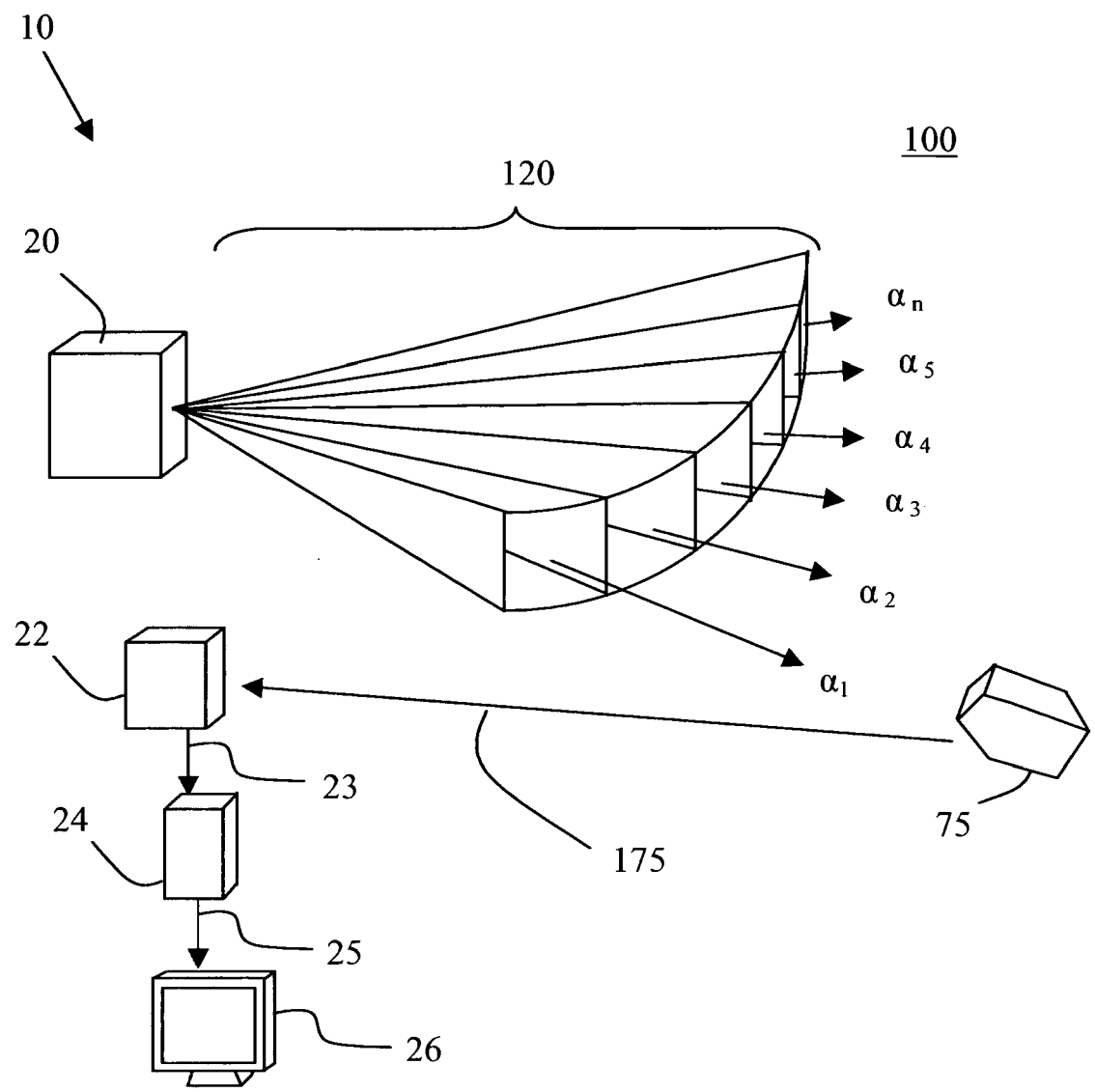
FIG. 1b shows another embodiment of a system for detecting an object of interest in a search space.

FIG. 1a depicts a system 10 for detecting an object of interest 75 in a search space 100 comprising at least one spatially encoded radiation signal generator 20, at least one radiation signal collector 22, and a processor 24. The radiation signal generator 20 may generate a spatially encoded radiation signal (SERS) 120, which may propagate into search space 100. Search space 100 may be water, or atmosphere. Once the SERS 120 encounters the object of interest 75, a reflected radiation signal 175 may reflect off of the object of interest 75 and propagate in the direction of the radiation signal collector 22. If the reflected radiation signal 175 is detected by the radiation signal collector 22, the radiation signal collector 22 may transform the reflected radiation signal 22 into a first data signal 23. The first data signal 23 may then be transmitted to the processor 24 where the first data signal 23 may be transformed into positional and vectoral data 25 of said object of interest 75. The vectoral and positional data 25 of the object of interest 75 may be based on an encoded characteristic of the reflected radiation signal 175. The vectoral and positional data 25 may then be sent to another processor, stored on a memory device, or displayed to a user. FIG. 1b shows an output device 26 which may communicate the vectoral and positional data 25 of the object of interest 75 to a user. Although FIG. 1b depicts the output device 26 as a visual display, it is to be understood that the output device is not limited to visual displays but may be any device—visual, audio, or tactile—that may be used to generate a user-comprehendible output of vectoral and positional data 25 of an object of interest 75. Additional encoding of the search space 100 may be realized by employing two or more radiation signal generators 20. Also, multiple radiation signal collectors 22 may be utilized to detect reflected radiation signal 175.

Also shown in FIGS. 1a and 1b, the SERS 120 comprises a series of n beams $\alpha_1$-$\alpha_n$ radially extending from the SERS generator 20, where n is an integer greater than one and a represents an electromagnetic wave with a unique defining characteristic, as described below. The SERS 120 may be encoded such that each of the beams $\alpha_1$-$\alpha_n$ is distinguishable from the other beams comprising SERS 120. For example, each of the beams $\alpha_1$-$\alpha_n$ of SERS 120 may be characterized as having a different wavelength $\lambda_1$-$\lambda_n$. In order to generate the SERS 120 comprised of beams $\alpha_1$-$\alpha_n$ each having a different wavelength $\lambda_1$-$\lambda_n$, the radiation signal generator 20 may be comprised of multiple electromagnetic sources, filters, grids, beam splitters, fiber splitters, diffractive optics, or any other comparable device capable of generating one or more wavelength-encoded spatial patterns. However, it is to be understood that the encoding of SERS 120 is not limited to wavelength, but that the SERS 120 may be encoded by wavelength, waveform (including temporal dependence), polarization state, spatial separation, or any combination thereof. It is also to be understood that the SERS 120 is not limited to electromagnetic radiation, but other types of radiation, such as acoustic radiation, may also be employed. Also, FIGS. 1a-7 show the cross-section of beams $\alpha_1$-$\alpha_n$ of SERS 120 as being rectangular, but it is to be understood that the cross-sections of beams $\alpha_1$-$\alpha_n$ of SERS 120 may be any shape in which a radiation signal may propagate, including polygons, ellipses, and circles, to name a few. FIG. 1a also shows how SERS 120 may be stratified in the x direction with beams 1-$n$, where x may be any defined direction.

In one example embodiment of system 10, SERS 120 may be wavelength encoded with the wavelength of beam $\alpha_1$ corresponding to wavelength $\lambda_1$. If beam $\alpha_1$ encounters an object of interest 75 then the reflected radiation signal 175 will have a wavelength of $\lambda_1$ provided the object of interest 75 is stationary. Positional data of the object of interest 75 may be determined quickly by correlating the wavelength $\lambda$, of the reflected radiation signal 175 with the wavelength $\lambda_1$ of beam $\alpha_1$, which is known to propagate in a specific region of search space 100. When the SERS 120 is wavelength encoded, the radiation signal collector 22 may comprise a low-resolution detector combined with simple collecting optics and a prism or color filter to identify the wavelength of the scattered radiation. If the object of interest 75 is moving, the wavelength of the reflected radiation signal 175 will be Doppler shifted. Vectoral data of the object of interest 75 may be determined by the processor 24 based on the degree of Doppler shift of the wavelength of reflected radiation signal 175 from wavelength $\lambda_1$. Providing sufficient spectral or spatial separation of beams $\alpha_1$-$\alpha_n$ in the encoding of SERS 120 should avoid any spatial overlap of similar wavelengths resulting from a Doppler shifted reflected radiation signal 175 and the reflected radiation signal 175 from a stationary object of interest 75.

Figure 2:
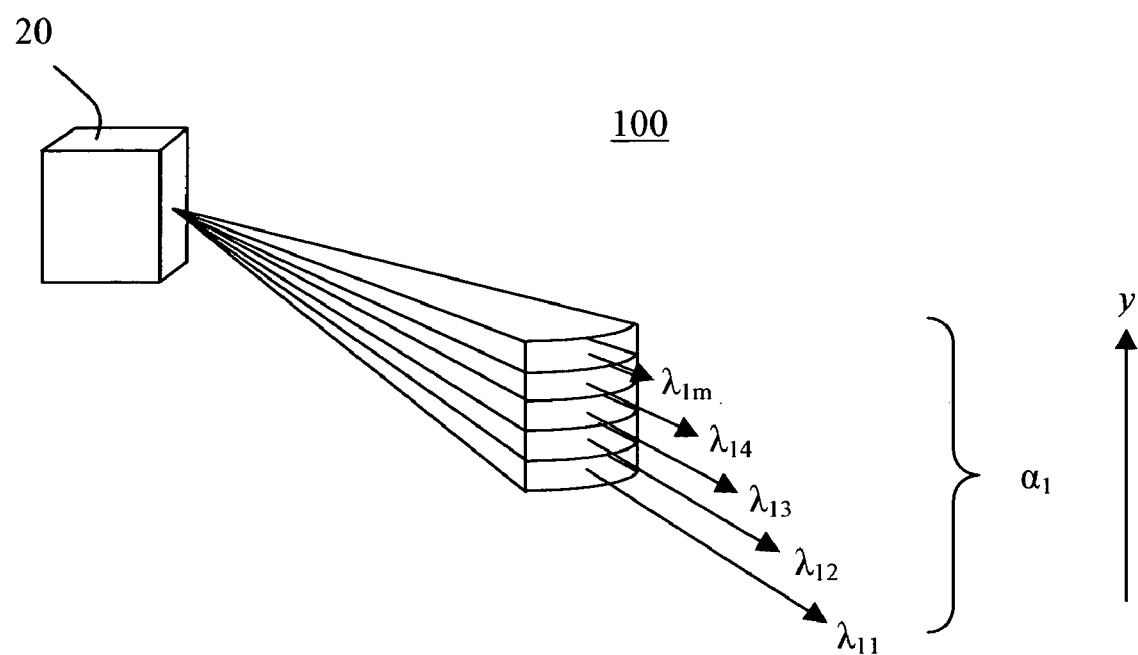
FIG. 2 shows a stratified encoded radiation signal.

FIG. 2 shows an embodiment of beam $\alpha_1$ in which beam $\alpha_1$, representative of each of beams $\alpha_1$-$\alpha_n$, may be encoded in they direction. In other words, beam $\alpha_1$ may be stratified in the y direction with m constituent sub-beams, where m is a positive integer greater than one, and where each of said constituent sub-beams has a unique characteristic such as wavelength, waveform (including temporal dependence), polarization state, or spatial separation. In one embodiment, x may be horizontal and y may be vertical such that the SERS 120 is encoded horizontally and each of beams $\alpha_1$-$\alpha_n$ may be encoded vertically. It is to be understood that direction x and direction y are not limited to horizontal and vertical, but each may be any well-defined orientation that is not equal to the other. By way of example, in one embodiment, each of the beams $\alpha_1$-$\alpha_n$ may be encoded by wavelength, wherein the wavelength of each beam varies in they direction. FIG. 2 shows the beam al encoded by wavelengths $\lambda_{11}$-$\lambda_{1m}$. However, it is to be understood that the encoding of each of the beams $\alpha_1$-$\alpha_n$, is not limited to wavelength, but that each of the beams $\alpha_1$-$\alpha_n$ may be encoded by wavelength, waveform (including temporal dependence), polarization state, spatial separation, or any combination thereof. As the SERS 120, encoded in both the x and y directions, propagates into search space 100, detailed positional and vectoral information may be determined in the manner described above from the reflected radiation signal 175. FIG. 2 also shows the cross-section of constituent sub-beams 1-$m$ as being rectangular, but it is to be understood that the cross-section constituent sub-beams 1-$m$ may be any shape in which a radiation signal may propagate, including polygons, ellipses, and circles, to name a few.

Figure 3:
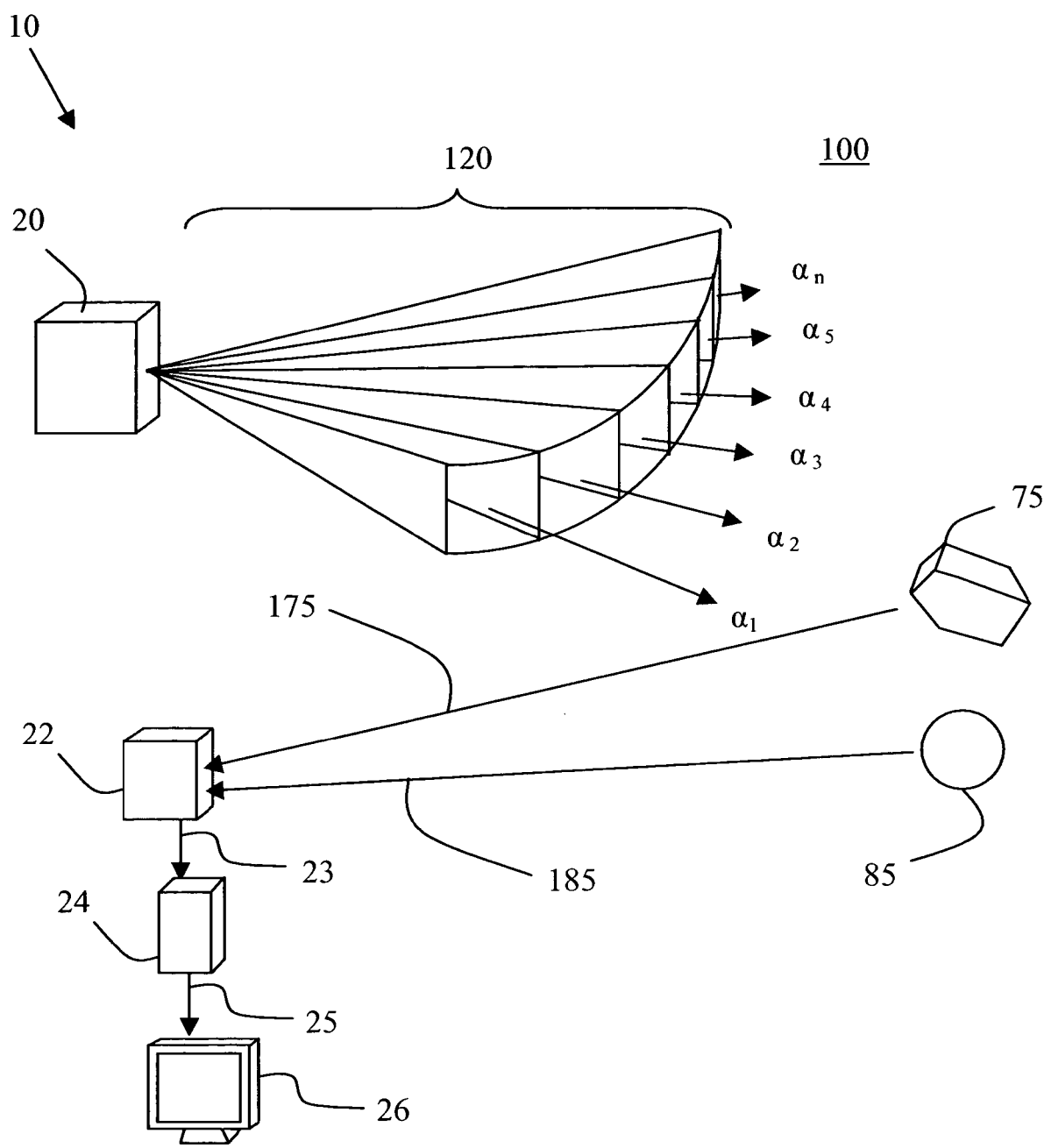
FIG. 3 shows an embodiment of a system for detecting an object of interest in a search space including a remote reference object.

FIG. 3 depicts another embodiment of system 10 comprising a remote reference object 85, which is disposed to emit a reference signal 185. In one embodiment, the reference signal 185 may be a sample of SERS 120 that is reflected off of the remote reference object 85 in the direction of the radiation signal collector 22. In another embodiment, the reference signal 185 may be generated by the remote reference object 85 and emitted in the direction of the radiation signal collector 22. Reference signal 185 may have known properties such as wavelength, waveform (including temporal dependence), polarization state, and spatial separation. By generating a known reference signal 185 at one or more remote positions within the radiation signal collector's 22 field of view, distortion corrections may be determined by the processor 24 by comparing the reference signal 185 actually received by the radiation signal collector 22 with the theoretical reference signal 185 calculated from the remote reference object's 85 known properties. The distortion corrections may then be applied to any reflected radiation signal 175 received by the radiation signal collector 22 to determine corrected vectoral and positional information of the object of interest 75. The use of one or more remote reference objects 85 may provide information regarding possible wave front distortion and multipath effects due to propagation of reference signal 185 through a search space 100 for a series of possible object of interest 75 positions. The remote reference object 85 may be non-physical such as a guide star produced by a laser, or a physical object of any shape with known reflective properties such as a point reflector that emits a spherical wave front. Other examples and a detailed description of remote reference object 85 may be found in U.S. Pat. No. 6,288,974 entitled, "System and Method for Enhancing Detection of Objects Through an Obscuring Medium."

Figure 4:
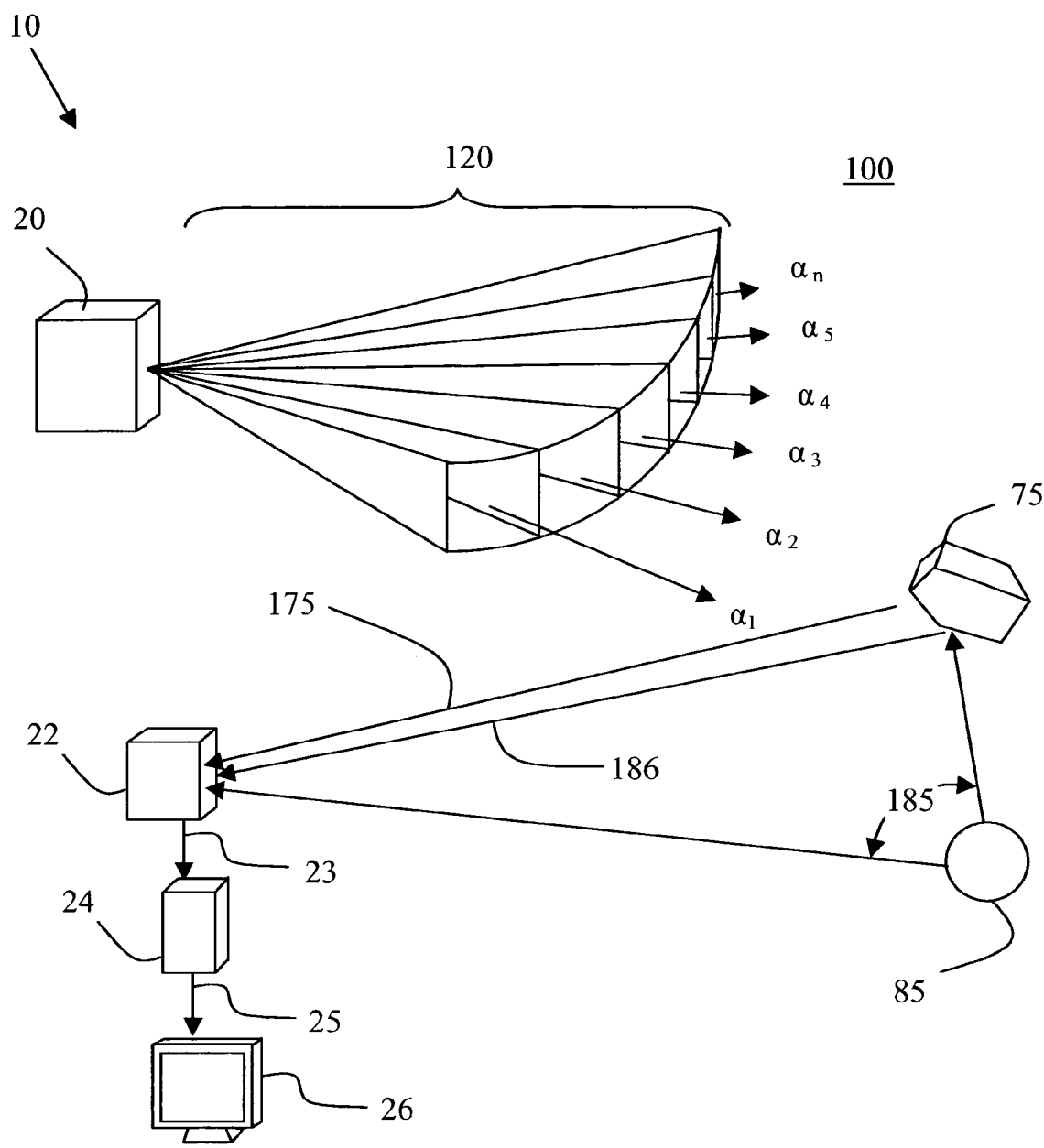
FIG. 4 shows another embodiment of the system for detecting an object of interest in a search space.

FIG. 4 shows another embodiment of a system for detecting an object of interest 75 in a search space 100, where the remote reference object 85 is a physical object capable of serving as a secondary source of radiation for illuminating (in part) the search space 100. In this embodiment the remote reference object 85 may generate a reference signal 185, which may propagate into search space 100 and in the direction of the radiation signal collector 22. If reference signal 185 encounters an object of interest 75 in search space 100, a reflected reference signal 186 may be reflected in a direction of propagation towards the radiation signal collector 22.

Figure 5:
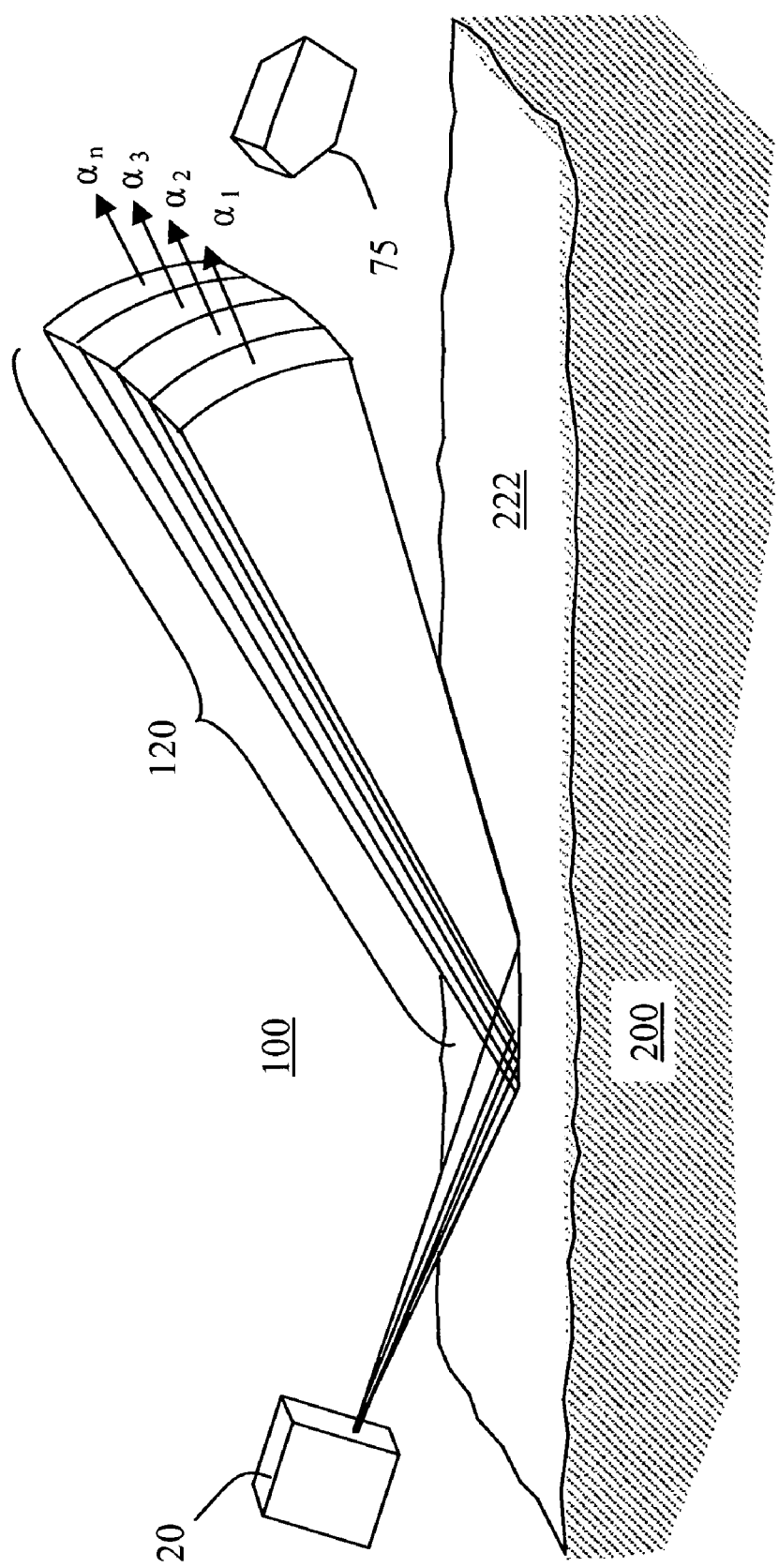
FIG. 5 shows a spatially encoded signal being reflected off of a boundary separating a search space and a boundary medium.
Figure 6:
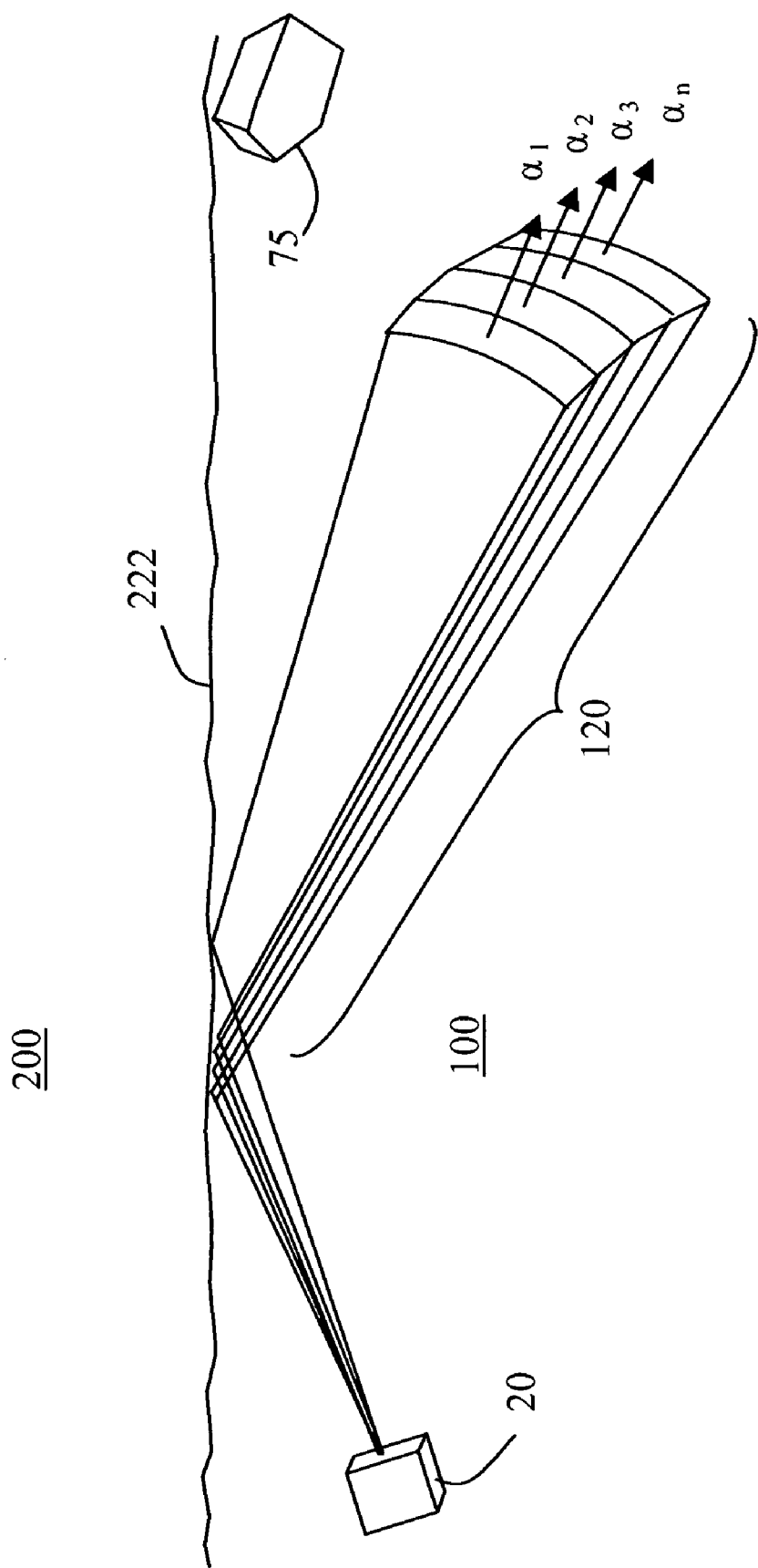
FIG. 6 shows a spatially encoded signal reflected off a boundary separating a search space and a boundary medium.

FIG. 5 depicts another embodiment of the SERS generator 20, where the search space 100 is separated from a boundary medium 200 by a boundary 222 and where the SERS 120 reflects off of the boundary 222. The boundary medium 200 may be atmosphere, water or earth. The boundary 222 is the interface between the search space 100 and the boundary medium 200. For example, in one embodiment the search space 100 in FIG. 5 may be atmosphere; the boundary medium 200, water; and the boundary 222, the water surface. In another embodiment, the search space 100, as shown in FIG. 5, may be ocean; the boundary medium 200, earth; and the boundary 222, the ocean floor. FIG. 6 depicts another embodiment where the search space 100 may be water; the boundary medium 200, atmosphere; and the boundary 222, the atmosphere-water interface. Allowing SERS 120 to reflect off of boundary 222 creates two opportunities for an object of interest 75 (if the object of interest 75 is moving) to pass through the SERS 120 (i.e. before and after the SERS 120 reflects off of boundary 222), thus providing two opportunities to emit a reflected radiation signal 175.

Figure 7:
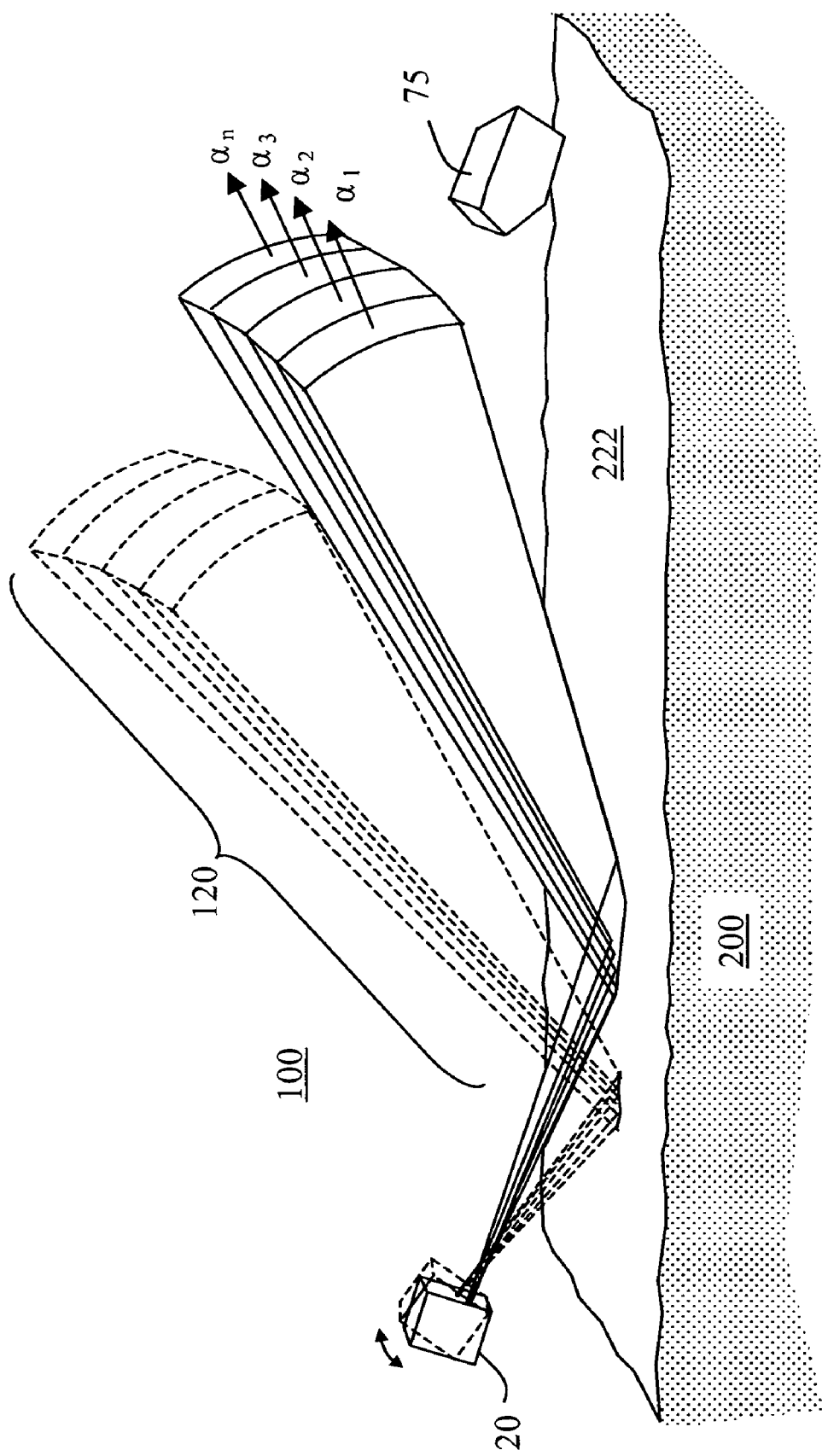
FIG. 7 depicts a spatially encoded signal reflected off a boundary separating a search space and a boundary medium.

FIG. 7 illustrates another embodiment of the SERS generator 20, where the orientation of the SERS generator 20 with respect to the boundary 222 may vary, thus altering the reflection point of SERS 120 off of boundary 222. The ability to vary the reflection point of the SERS 120 off of boundary 222 allows more of the search space 100 to be interrogated by SERS 120.

From the above description of the System and Method for Detecting an Object in a Search Space, it is manifest that various techniques may be used for implementing the concepts of system 10 without departing from its scope. The described embodiments are to be considered in all respects as illustrative and not restrictive. It should also be understood that system 10 is not limited to the particular embodiments described herein, but is capable of many embodiments without departing from the scope of the claims.

I claim:

1. A system for detecting an object of interest in a search space, comprising:

a radiation signal generator capable of irradiating said object of interest when moving in said search space with a spatially-encoded radiation signal, wherein said spatially-encoded radiation signal comprises a series of n beams radially extending from said radiation signal generator, wherein n is a positive integer greater than one, and wherein each of said beams has a unique characteristic;

a radiation signal collector disposed to detect and transform a reflected radiation signal reflected from said object of interest into a first data signal;

a processor capable of transforming said first data signal into positional and vectoral data of said object of interest; and wherein said search space is separated from a boundary medium by a boundary and wherein said radiation signal generator is configured to direct said spatially-encoded radiation signal in a direction such that said spatially-encoded radiation signal reflects off of said boundary before reflecting off of said object of interest.

2. The system of claim 1, further comprising an output device capable of displaying said positional and vectoral data to a user.

3. The system of claim 1, wherein each of said beams corresponds to a different wavelength.

4. The system of claim 1, wherein each of said beams corresponds to a different polarization state.

5. The system of claim 1, wherein each of said beams corresponds to a different waveform.

6. The system of claim 1, further comprising a remote reference object with known physical properties wherein said remote reference object is capable of transforming said spatially-encoded radiation signal in said search space into a reflected reference signal and wherein once said reflected reference signal is received by said radiation signal collector, said processor is configured to determine corrected vectoral and positional information of said object of interest such that wave front distortion and multipath effects are corrected.

7. The system of claim 1, further comprising a remote reference object configured to be the source of a generated reference signal, wherein said generated reference signal has known properties and may be transformed into a second reflected radiation signal and directed to said radiation signal collector upon encountering said object of interest in said search space and wherein once said second reflected reference signal is received by said radiation signal collector, said processor is configured to determine corrected vectoral and positional information of said object of interest such that wave front distortion and multipath effects are corrected.

8. The system of claim 1, wherein said radiation signal generator is configured to interrogate said search space by altering the point of reflection of said spatially-encoded radiation signal off of said boundary.

9. The system of claim 1, wherein said spatially-encoded radiation signal is stratified in an x direction with said n beams and each of said n beams is individually radially stratified in a y direction with m constituent sub-beams, where m is a positive integer greater than one, each of said constituent sub-beams has a unique characteristic, and said x and y directions are not equal.

10. The system of claim 9, wherein each of said constituent sub-beams is encoded by wavelength.

11. The system of claim 9, wherein each of said constituent sub-beams is encoded by polarization state.

12. The system of claim 9, wherein each of said constituent sub-beams is encoded by waveform.

13. A method for detecting an object of interest, comprising:
propagating a spatially-encoded radiation signal within a search space, wherein said spatially-encoded radiation signal comprises a series of n beams radially extending from a radiation signal generator, wherein n is a positive integer greater than one, and wherein each of said beams has a unique characteristic;
reflecting said spatially-encoded radiation signal off of a boundary separating a boundary medium from said search space;
receiving a reflected radiation signal from said object of interest moving within said search space;
retrieving positional information of said object of interest from said reflected radiation signal;
retrieving vectoral information of said object of interest from said reflected radiation signal; and
displaying said positional and vectoral information to a user.

14. The method of claim 13, wherein each of said beams corresponds to a different wavelength.

15. The method of claim 13, wherein each of said beams corresponds to a different polarization state.

16. The method of claim 13, wherein each of said beams corresponds to a different waveform.

17. The method of claim 13, wherein said spatially-encoded radiation signal is stratified in the x direction with said n beams and each of said n beams is individually radially stratified in the y direction with m constituent sub-beams, where m is a positive integer greater than one, where each of said constituent sub-beams has a unique characteristic, and where x and y are not equal.

18. The method of claim 13, further comprising the step of:
receiving a reference signal from a reference object within said search space; and
correcting said positional and vectoral information in reference to said reference signal.

19. The system of claim 13, further comprising interrogating said search space by altering the point of reflection of said spatially-encoded radiation signal off of said boundary.

* * * * *